(12) United States Patent
Barathan et al.

(10) Patent No.: US 6,847,639 B2
(45) Date of Patent: Jan. 25, 2005

(54) MANAGING FEATURE INTERACTION AMONG A PLURALITY OF INDEPENDENT FEATURE SERVERS IN TELECOMMUNICATIONS SERVERS

(75) Inventors: Mohana Saravanan Barathan, Sunnyvale, CA (US); Edward A. Clark, Sugar Grove, IL (US); Alan Eugene Frey, Naperville, IL (US); Gang Gary Huang, Naperville, IL (US); Prashant Shashikant Parikh, Naperville, IL (US); Henry Thomas Peter, Campbell, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 931 days.

(21) Appl. No.: 09/730,251

(22) Filed: Dec. 5, 2000

(65) Prior Publication Data

US 2002/0067818 A1 Jun. 6, 2002

(51) Int. Cl.[7] .................................. H04J 3/16
(52) U.S. Cl. ....................................... 370/389
(58) Field of Search ................. 370/389, 351, 370/352, 401, 465; 379/219, 220.01, 221.06, 222.09, 222.13, 227

(56) References Cited

U.S. PATENT DOCUMENTS

| | | | |
|---|---|---|---|
| 5,337,351 A | 8/1994 | Manabe et al. | 379/201 |
| 5,404,396 A | 4/1995 | Brennan | 379/201 |
| 5,448,631 A | 9/1995 | Cain | 379/201 |
| 6,731,625 B1 * | 5/2004 | Eastep et al. | 370/352 |
| 6,754,181 B1 * | 6/2004 | Elliott et al. | 370/252 |

OTHER PUBLICATIONS

M. Cain; Managing Run–Time Interactions Between Call–Processing Features; IEEE Communications Magazine, 2/92, pp 44–50.

* cited by examiner

*Primary Examiner*—Dang Ton (57) ABSTRACT

This invention relates to a method and apparatus for permitting a telecommunications switch to interact with a plurality of feature servers. All feature request messages from the switch are directed to a service integration node. A Policy Manager software and database system in the service integration node analyzes received request messages from the telecommunications switch, and generates one or more request messages to one or more of the feature servers. The Policy Manager controls the sequencing of feature request messages in cases where a plurality of feature servers, or a plurality of different application programs on one feature server, are required in order to supply the telecommunications switch with the response information necessary for executing the feature. Advantageously, using this type of arrangement, a telecommunications switch can communicate with a plurality of feature servers while controlling interaction among different features triggered by a common event, such as an incoming call.

11 Claims, 5 Drawing Sheets

MANAGING FEATURE INTERACTION AMONG A PLURALITY OF INDEPENDENT FEATURE SERVERS IN TELECOMMUNICATIONS SERVERS

TECHNICAL FIELD

This invention relates to a method and apparatus for interfacing between telecommunications switching systems and telecommunications application servers.

PROBLEM

Originally, all feature control software for program controlled electronic telecommunication switching systems was stored in the switching system which provided service to the customers. More recently, in order to serve the needs of common carriers which wanted to provide features under their own control without requiring the switch to be provided with the software for implementing a feature, the intelligent network was provided. An intelligent network is a group of controllers and their associated databases which respond to requests for call control direction by providing responses to these requests. The intelligent network is a distributed processing system, all of whose service is under the control of a common carrier. Feature interactions in this system are controlled by that common carrier.

More recently, pressure has built up to permit outside vendors to supply special feature software. The outside vendors may be more competitive in the pricing of their software, and more responsive to needs expressed by the common carrier than the common carriers own software development group. Further, the outside vendors may have their own ideas as to additional features, and may wish to protect the revenue associated with these ideas by directly providing the software for implementing these features.

When such third party software is used for implementing features, the third party itself, has the responsibility for ensuring that feature interactions are properly handled. At the present time, this is relatively straightforward because only one third party vendor can provide feature software to a switch.

A problem with the prior art is that because of the problems of feature interaction, a plurality of third party application vendors cannot be connected to a common telecommunications switch. As a result, a carrier is confined to the use of a single third party vendor of feature software, even if other competitive potential feature software providers may offer a more advantageous specialized feature package for a sub-set of the features than the sub-set offered by the single third party vendor.

SOLUTION

The above problem is solved, and an advance is made over the teachings of the prior art in accordance with this invention, wherein a service integration node is interposed between the telecommunications switch and each of a plurality of third party application servers. The service integration node comprising a message switch and a Policy Manager controller intercepts all messages from the switch to third party application vendors, and steers an appropriate sequence of messages based on a request message to appropriate ones of the third party application vendors. Responses from the application vendors are returned to the service integration node which may return the response to the switch, or may generate additional requests to the same or other third party application servers. Advantageously, the switch is shielded from any adverse feature interactions, and can, therefore, request service from a plurality of third party application vendors.

In accordance with one preferred embodiment of Applicants' invention, the Policy Manager controller stores a profile for each customer subscribing to a feature provided by one or more of the third party application servers. When a request message is received in the service integration node, the Policy Manager examines the event reported in the request, and decides whether one or a plurality of specific requests should be sent to the third party application servers, and which third party application server should receive which event message. Advantageously, the interface to a third party application server is one in which that server receives a request and generates a response. This will make the requirements of the interface between third party application servers and the service integration node straightforward, thus making it possible for third party application servers to provide software with a minimum of required detailed knowledge of the software structure of the telecommunications switch.

DETAILED DESCRIPTION

Figure 1:
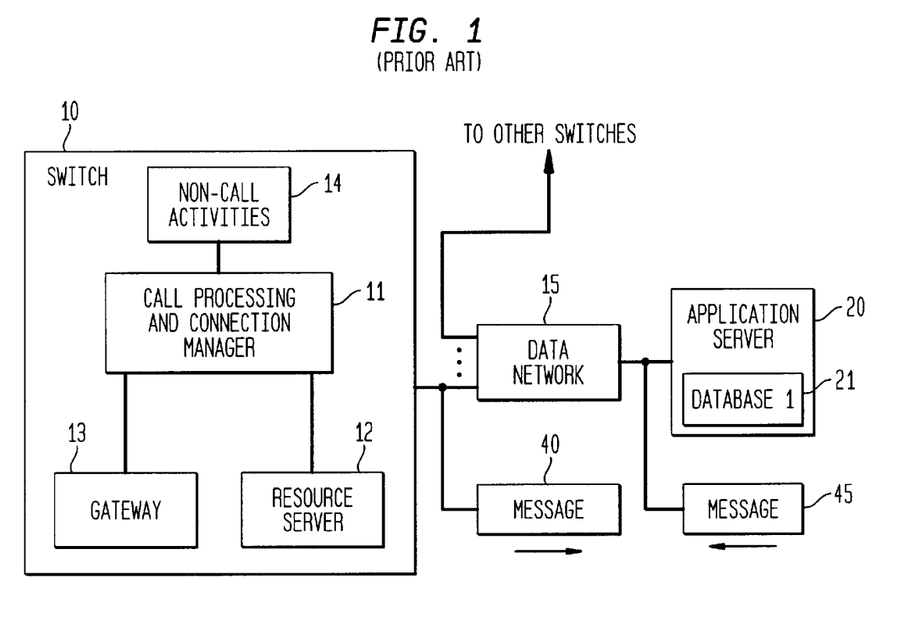
FIG. 1 is a block diagram illustrating the operation of the prior art, wherein a single third party application server provides third party features to a switch.

Before describing the block diagram of FIG. 1, Applicants would like to explain in a broad sense what the object of their invention is, and how the various pieces fit together. In this description, event information datagrams represent any event, such as an off-hook signal, a busy indication, a disconnect, or a signal representing customer data such as destination number, route selection information, (for example, to select an alternate common carrier, etc.), on which a customer wants action to be taken. The action datagram represents any information for gathering requests (such as playing an announcement, collecting digits), a next step for processing a call (like making a connection to a dialed number or some alternate number), or a default treatment in response to the event. The programmable switch is a switch connected to the customer. In accordance with the prior art, from that switch's point of view, it is working with one external application server for each customer/event pair; the switch either directly processes the event datagram, or sends the event datagram for processing by an external application server. The switch pre-defines the possible applicable actions to be taken by external application servers for each event. The same switch is provided for all application providers to process action datagrams and send event request datagrams.

In accordance with Applicants' invention, a service integration node is a common interface for any of a plurality of switches and any of a plurality of application server nodes. Service integration and interaction are managed using a Policy Manger of the service integration node whose specific data tables are maintained by the service provider and the application server provider. The Policy Manager contains data for all of the applications, customers, and events/action relationships.

Application Servers are distributed in the network. The Application Servers communicate with the switch or service integration node using a protocol such as JTAPI (Java Telephony Application Provider Interface), or PARLAY API. The Application Managers manage application specific data and may allow end user customization of the data in the service node. The application server nodes perform their tasks by controlling event/action sequencing.

Concerning the process of performing actions in response to events, each event is processed completely by the application server nodes before processing of the next event occurs. The Policy Manager may aggregate some of the action outputs, in order to optimize performance. Each application server is unaware of the presence of other application servers, i.e., is independent of these other application servers. Each application server can access the host switch information via action calls, (datagrams).

FIG. 1 is a block diagram illustrating the operation of the prior art. Block (10) contains the pertinent building blocks of a telecommunications switch. The bulk of the software for controlling calls is in Block (11), the call processing and connection manager. This unit communicates with a resource server (12) for accessing network resources, for example, for providing announcements and conference circuits. It also deals with a gateway (13) for interfacing with trunks to other switches, and customer premises equipment connected to this switch. The call processing and connection manager also communicates with Block (14), which is software for such non-call activities as maintenance. When the call processing and connection manager recognizes that the event has occurred, which requires direction from the application server (20), the call processing and connection manager sends a message, such as message (40), (illustrated on FIG. 2), over data network (15) to the single application server (feature server) (20). This feature server analyzes the message and responds with one or more response messages (45), instructing the call processing and connection manager on how the call is to be processed. Responsibility for all feature interactions lies with the third party feature application server (20).

The application server (20) comprises a database (21) for storing, for example, customer profiles for each customer subscribing to a feature that is controlled by the application server. The database may also be used for storing the present status of each such customer, because this status may affect how an event message from the telecommunications switch (10) is processed. Application server (20) generates one or more response messages to the telecommunications switch (10) in order to implement the desired feature action.

Figure 2:
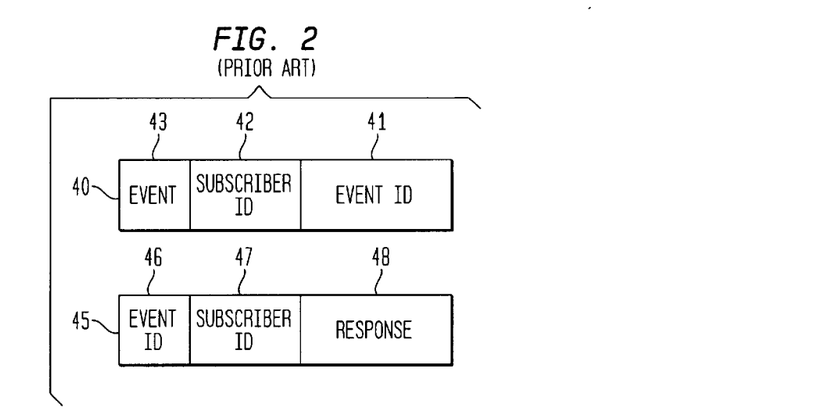
FIG. 2 illustrates the basic messages exchanged between the switch and the third party application server in the prior art.

FIG. 2 shows messages (40) and (45) of FIG. 1 in more detail. Message (40) comprises an event identifier (41), a subscriber identifier (42), and an event descriptor (43). The response message (45) comprises the same event identifier (46) for use in processing the response, the same subscriber identifier (47), and a response (48).

Figure 3:
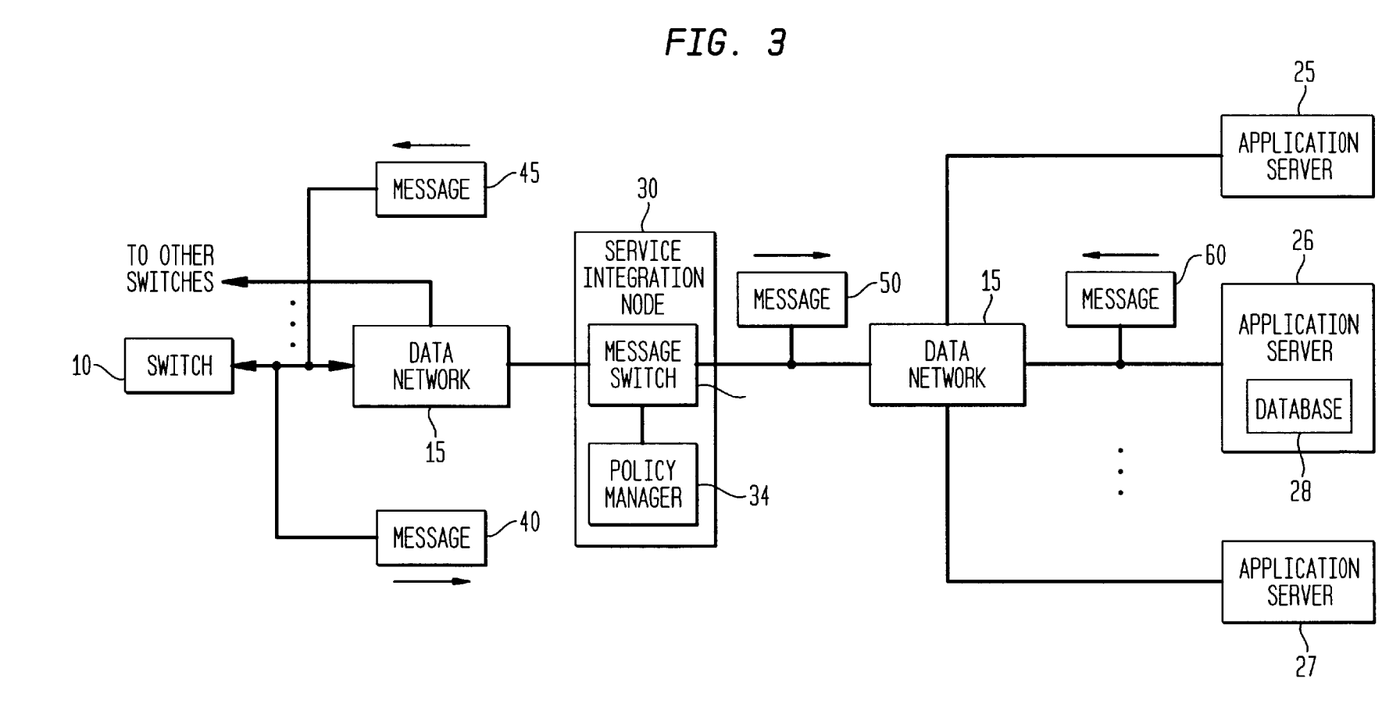
FIG. 3 is a block diagram illustrating the operation of Applicants' invention for working with a plurality of feature servers.

FIG. 3 illustrates the operation of Applicants' invention. The same switch (10) generates the same messages, (datagrams) (40), transmitted over data network (15), and receives the same response messages (45), also transmitted over data network (15). The messages (40) go to a service integration node (30), which consists of a message switch (32), and a Policy Manager (34). The message switch (32) receives a message (40) from telecommunications switch (10), and passes this message to the Policy Manager (34). The Policy Manager generates one or more request messages (50) for transmission over data network (15) to one of the plurality of third party application servers (25), (26), . . . , (27). Suppose that the Policy Manager, based on the received message (40) and its stored policy for that subscriber, decides to send a message (50) to third party application server (26), this message is passed to the message switch, which then forwards that message to that third party application server. The server receiving that message, processes it and generates one or more response messages (60) for transmission over data network (15). These response messages are sent back to message switch (32) for analysis by the Policy Manager (34). The Policy Manager may simply request that the key contents of message (60) be returned to telecommunications switch (10) in a message (45), but may also recognize that the original event message implies a plurality of request messages, which may be sent to the same, or different, application servers. In the latter case, the Policy Manager would cause another message (50) to be transmitted to the same, or another, application server.

Eventually, an action request is executed by the switch (10), responding to one or more response messages (45).

Figure 4:
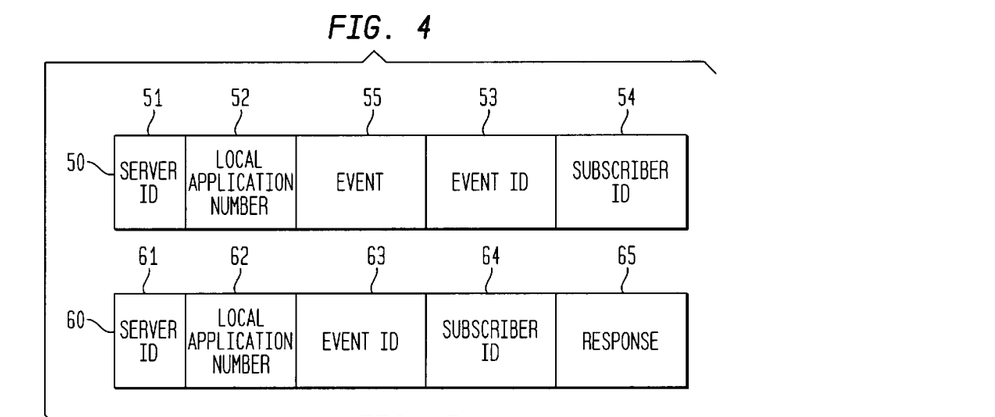
FIG. 4 is a diagram illustrating the messages used in FIG. 3.

FIG. 4 is a diagram illustrating the additional messages required for Applicants' invention. Message (50) is a message from the service integration node to one of the third party application servers. The message includes a server identifier (51), a local application number (52), an event identifier (53), subscriber identifier (54), and an event descriptor (55). The message is basically the same as message (40), but expanded to include the additional identifiers required for dealing with a plurality of servers.

The server responds with a response message (60), which includes a server identifier (61), a local application number (62), an event identifier (63), subscriber identifier (64), and response (65). The Policy Manager examines this response message, and determines, based on the context of the event identifier and subscriber identifier, what action to take next. The action may be simply to pass on the response message as a message (45) to the telecommunications switch (10), or may cause the Policy Manager to generate another message similar to message (50), representing an additional query, and sending that query to the same, or a different third party application server, or the Policy Manager may do both.

The message switch (32) contains information for locating the application server, (e.g., 25, 26, 27), including both the identification of the application and that physical location of the application for the purpose of routing messages to the application server. The message switch also contains information for locating the switch of the call which is being served, including the identification of the switch and the physical location of the switch for the purpose of routing messages to the switch.

The Policy Manger (34) contains subscriber profile information, including subscriber's identification and a list of the features subscribed to by that subscriber. The Policy Manager also contains information for use in selecting the algorithm to be used for selecting the feature to be executed, and information concerning feature interactions. Based on the feature list of the identified subscriber, the algorithm will select the feature to be executed, and in case of events which may require the execution of multiple features, the condition, if any, for sequencing among the features, or for broadcasting feature execution requests to a plurality of feature servers.

Figure 5:
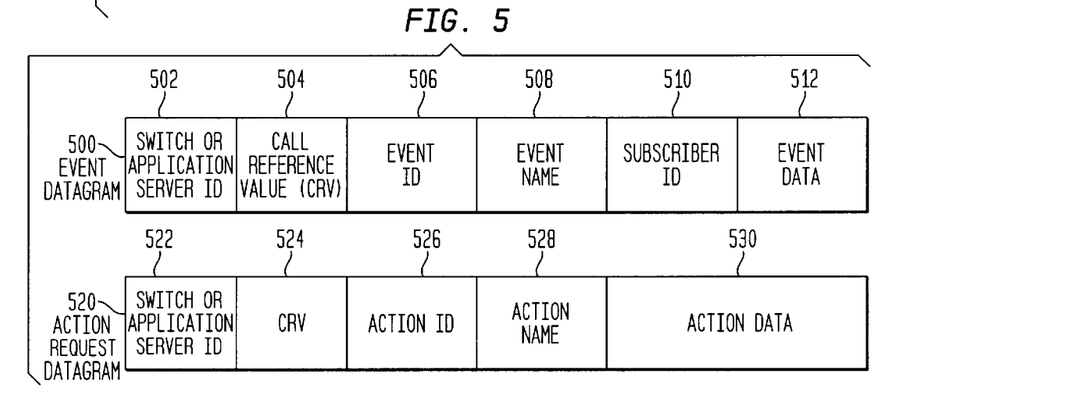
FIG. 5 illustrates event and action datagrams exchanged among the switches, Policy Manager, and application server.

FIG. 5 illustrates the event and action datagrams for datagrams exchanged among the switches, Policy Managers, and feature servers. Some of these datagrams have been described in FIGS. 2 and 4. A Policy Manager receives or sends an event datagram (500) from a switch or to an application, the datagram comprising the following fields:

a switch or application identifier (502) of the switch or application of the event datagram;

a call reference value (CRV) (504) for identifying the call;

an event identifier (506), identifying the particular event for which appropriate feature action is requested;

an event name (508), indicating the type of event that is being reported;

the subscriber's identification (510), identifying the subscriber who generated the event; and event data (512), providing particulars about the specific event.

Action request datagram (520) is sent from the Policy Manager to the switch or from the application server to the Policy Manager. The datagram includes:

the switch or application identifier (522) of the switch or application of the datagram;

a call reference value (CRV) (524);

the action identifier (526), indicating the specific identification number of the action request;

the action name (528), indicating the type of action being requested; and action data (530), providing specific data for the switch to carry out the action.

Figure 6A:
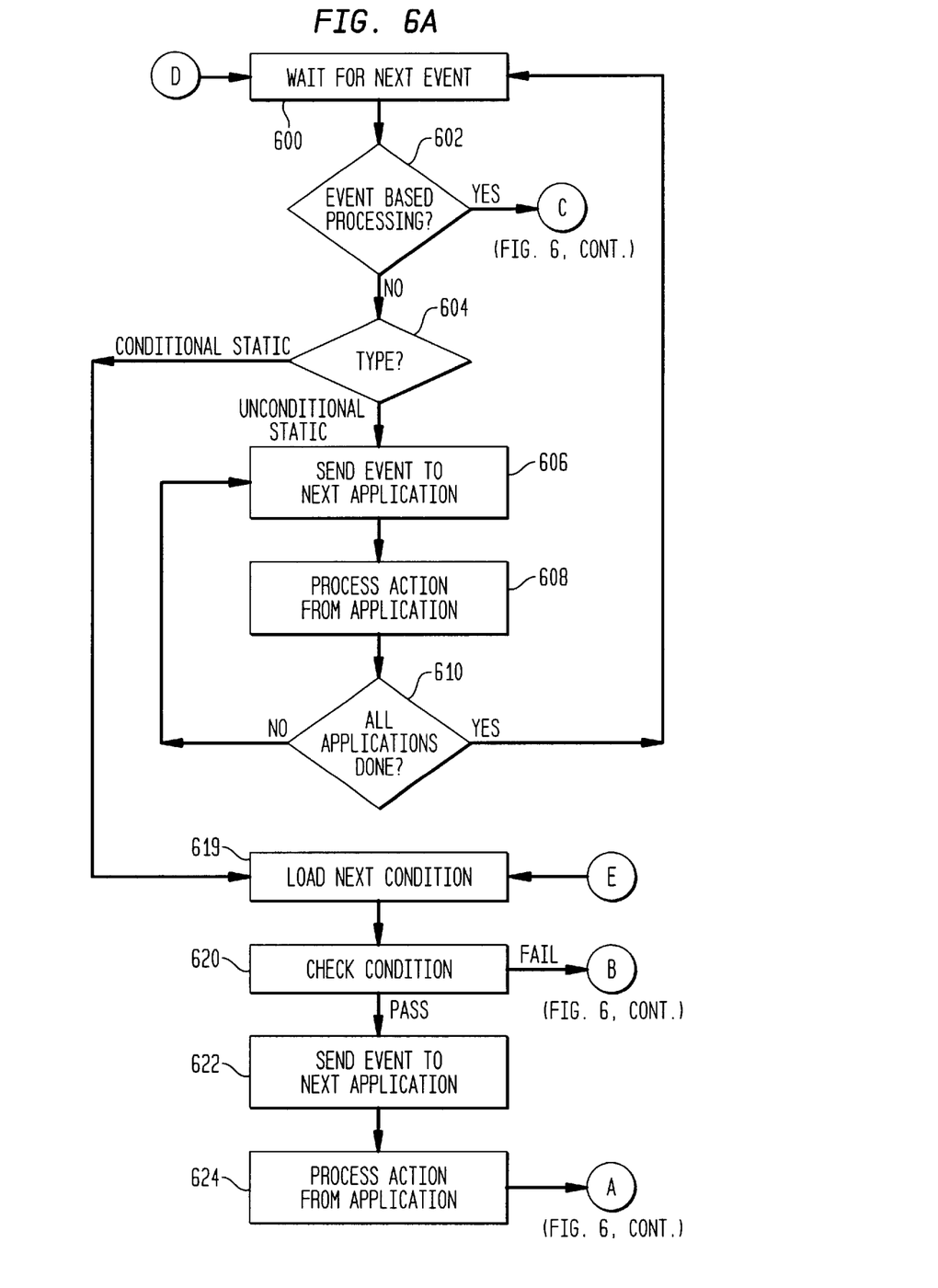
FIGS. 6A–6B are a flow diagram illustrating the operation of Applicants' invention.
Figure 6B:
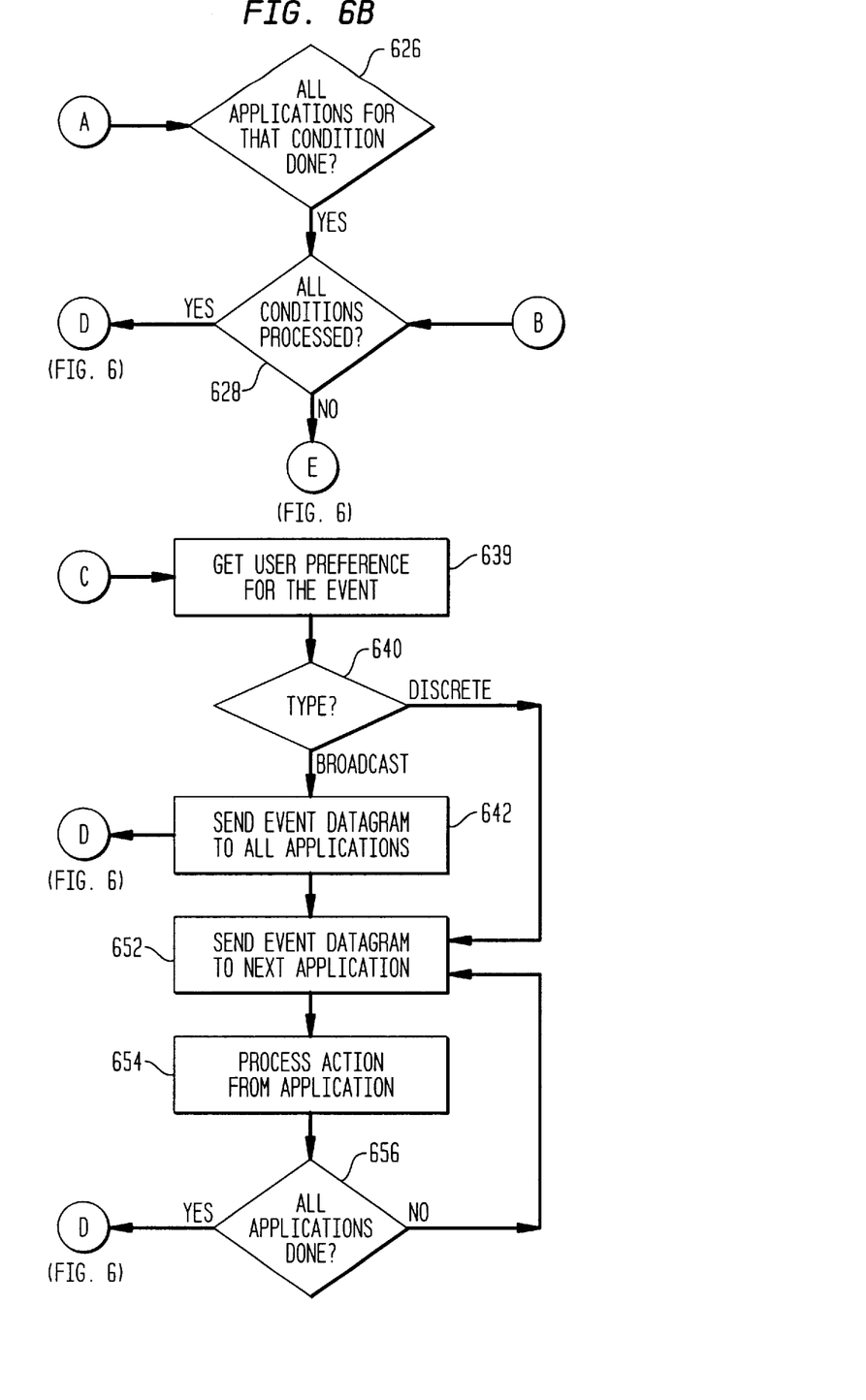

FIG. 6A–6B are a flow chart illustrating the operations of the Policy Manager. In the quiescent state (600), the Policy Manager is waiting for an event datagram. Upon receipt of an event datagram, Test 602 is used to determine whether an event processing algorithm should be used.

If the result of Test 602 is negative, indicating that a feature based processing algorithm is to be used, then Test 604 is used to determine the type of algorithm processing. If the processing is of an unconditional static type of algorithm, the event is passed to applications sequentially in a predefined order specified by the user. Then, an event datagram is sent to the next application server (feature server), (Action Block 606). When the response from this application server is returned, this response is processed, (Action Block 608). The processing can result in sending an action datagram to the switch, and/or in setting local variables within the Policy Manager. Test 610 is then used to determine if all the applications for the particular event have been completed. If not, Action Block 606 is re-entered. If the result of Test 610 is positive, then Action Block 600 is re-entered.

If the event is of a type which requires conditional static assignment of features, i.e., assignment of features depending on responses from the feature server, then the output of Test 604 leads to Action Block 619. Action Block 619 loads the next condition from the local data table of the Policy Manager. Then, Test 620 checks the condition. If the condition has passed, (indicating that further action is required), then an event message is sent to the feature server of the next application, (Action Block 622). When a response from the feature server is returned, Action Block 624 processes the action of the message from the feature server. Next, the Policy Manager checks whether all applications responsive to the condition have been completed, (Test 626). If not, Action Block 622 is re-entered. Then, Action Block 624, and Test 626 are repeated. If Test 626 indicates that all applications for that condition have been processed, then Test 628 is entered to check whether all conditions have been processed. If so, Action Block 600 is re-entered. If all conditions have not been processed (negative result of Test 628), then Action Block 619 is re-entered.

If the result of Test 602 is an indication that an event processing algorithm is to be used, (positive result) then, the User Preference for that event is read, (Action Block 639). Then, Test 640 is used to determine whether the event requires action by broadcasting an action message to a plurality of feature servers, or whether the action messages should be sent to individual feature servers, possibly in sequence. If the result of Test 640 indicates that a broadcast of an event message to a plurality of feature servers is required, then the event message is sent to all of the selected application feature servers, (Action Block 642). (In general, broadcast types of events do not require further actions as shown, for example in Block 608). Thereafter, Action Block 600 (Wait for Next Event), is re-entered.

If the result of Test 640 is an indication that event messages should be sent in some sequence to individual application feature servers, then an action message is sent to the next application feature server, (Action Block 652), and a response from that feature server is processed, (Action Block 654). Test 656 is used to determine if all applications have been completed for this event. If so, then Block 600 is entered. If not, Action Block 652 is re-entered.

In order to illustrate the operation of Applicants' invention in a specific instance, which includes conditional static events, assume that there are three third party application servers: the first server screens incoming calls based on the caller's identification, (i.e., directory number), and on the screening policy requested by the called party. The second server provides an enriched feature set for call waiting situations. The third application server provides call forwarding service. Assume that there is an incoming call to one of the parties subscribing to all three services. The event message received in the Policy Manager is the arrival of the call, and the calling party's identification. The Policy Manager recognizes that the subscriber has subscribed to all three feature packages and sends a message initially, to the feature server for call screening, (because if the call is to be screened, there is no need to either forward it, or to consider call waiting treatment). Assume that the response is that the call is not to be screened, (if the call is to be screened, a response can immediately be sent to telecommunications switch (10) to return call termination denial treatment to the caller).

The call waiting feature server is invoked. This will only be done if the called party is busy. If the called party is idle, then the Policy Manager does not send a message to the call waiting feature server. If the called party is busy, then the Policy Manager prepares to send a request for appropriate called call waiting treatment, but does not send this request until it has queries the call forwarding server to determine if waiting calls should be forwarded.

For the case that the called party is idle, the call forwarding server is invoked to determine whether the call should be forwarded.

This example can be arranged to have further decision points within the Policy Manager. For example, if the call waiting server and the call forwarding server allow these features to be activated and deactivated, then the response of the server will be affected by the activation stage requested by the called party.

Based on the outcome of the screening action, the next action could be disconnect, call waiting only, call forwarding only, or call waiting followed, after a time-out, by call forwarding.

The message interchange flow can also be affected by specifics of the event. For example, if some or all of the customers of switch (10) have immediate response to emergency incoming calls so that such calls are immediately connected overriding any existing connections to the called party, then the specialized event (incoming emergency call), leads to a different sequence of actions. This can be recognized at the time the call is screened. However, if the emergency incoming call is recognized at the switch, (e.g., a 911 call), this may be a different event, served by a completely different server. Finally, there are some events which lead to the Policy Manager sending a plurality of messages to a plurality of servers. For example, in the case of a disconnect, the message might be sent to all three of the servers discussed in the previous example.

In this system, one Policy Manager and one application feature node can serve many switches. The advantages of this architecture are many. For example, many customers, including customers on many different switches, are able to share and subscribe to a feature provided by one application service provider (ASP). However, any customer may subscribe to features provided by many different ASPs. It is possible to customize the policies for feature interaction by different common carriers and third party service providers, and apply these policies. The operation, administration, maintenance, and provision for new system for new features can be integrated with a base OAM&P of the service providers by using existing interfaces to network management systems, provisioning systems, etc. The control allocation and ownership of network resources among new features, can be allocated fully using the Policy Manager. Billing and measurement modules can be readily added as new modules to existing records on the switch.

It is the Policy Manager which decides on the sequencing of messages based on the event and the responses from the third party application servers.

The above is a description of one preferred embodiment of Applicants' invention. Many other embodiments will be apparent to those of ordinary skill in the art without departing from the scope of the invention. The invention is limited only by the attached Claims.

What is claimed is:

1. Apparatus for communicating between a telecommunications switch and a plurality of at least two application servers, comprising:

a telecommunications switch;

a service integration node; and a plurality of application servers;

said switch for generating an event request datagram for feature control information, and for transmitting said request datagram to said service integration node;

said service integration node for analyzing said event request datagram from said telecommunications switch, and converting said event request datagram into one or more feature request datagrams;

said service integration node for assigning each feature request datagram to an application server, and for transmitting one or more feature request datagrams to one or more assigned application servers;

said application servers for analyzing received request datagrams, and for generating action datagrams for transmission to said service integration node;

said service integration node responsive to receipt of said action datagrams for generating at least one of an action datagram to said telecommunications switch, or an additional event request datagram to one of said application servers.

2. The apparatus of claim 1, wherein said service integration node comprises a Policy Manager for analyzing request datagram received from said telecommunications switch;

based on said analyzing, for transmitting said feature request datagrams to one or more feature servers; and responsive to receipt of a response datagram from a feature server, for generating at least one of a response datagram to said telecommunications switch or an additional request datagram to one of said application servers.

3. The apparatus of claim 1, further comprising at least one additional telecommunications switch, wherein said service integration node serves said telecommunications switch and said at least one additional telecommunications switch.

4. The apparatus of claim 1, wherein said telecommunication switch, said service integration node, and said plurality of application servers are interconnected by a data network.

5. The apparatus of claim 1, wherein said service integration node comprises a database for storing information about customers served by said telecommunications switch.

6. The apparatus of claim 1, wherein said service integration node stores information about how customers served by said telecommunications switch are to have request datagrams associated with events for said customers are to be processed by ones of said plurality of feature servers.

7. The apparatus of claim 1, wherein at least one of said plurality of application servers comprises a database for storing information about customers served by said telecommunications switch.

8. Apparatus for interfacing between a telecommunications switch and a plurality of at least two application servers, comprising:

a service integration node;

said service integration node comprising means for communicating with said telecommunications switch and said plurality of application servers; and a database for storing information about customers served by said telecommuncations switch;

said service integration node responsive to an event request datagram received from said switch for analyzing said event request datagram, and converting said event request datagram into one or more feature request datagrams;

said service integration node for assigning each feature request datagram to an application server;

said service integration node for transmitting said one or more feature request datagrams to one or more assigned application servers;

said service integration node responsive to receipt of one or more action datagrams from said assigned application servers for generating at least one of an action datagram to said switch, or an additional event request datagram to one of said application servers.

9. The apparatus of claim 8, wherein said service integration node is further connected to at least one additional telecommunications switch, and wherein said service integration node serves said telecommunications switch and said at least one additional telecommunications switch.

10. In a telecommunications system comprising a telecommunications switch and a plurality of at least two application servers, a method of deriving information for implementing a feature for a customer served by said telecommunications switch, comprising the steps of:

generating an event request datagram for feature control information in said switch, and transmitting said request datagram to a service integration node;

in said service integration node, analyzing said event request datagram and converting said event request datagram into one or more feature request datagrams;

assigning each feature request datagram to an application server;

in said application servers, analyzing received request datagrams and generating action datagrams for transmission to said service integration node;

responsive to receipt of action datagrams in said service integration node, generating at least one of an action datagram to said telecommunications switch, or an additional event request datagram to one of said application servers;

wherein, eventually at least one action datagram is sent to said telecommunications switch in response to said event request datagram.

11. The method of claim 10, wherein the step of analyzing said event request datagram comprises the step of analyzing said request datagram using a Policy Manager, wherein said Policy Manager has access to a database for storing information about customers served by said telecommunications switch.

* * * * *